United States Patent [19]

Grubhofer et al.

[11] 3,770,603
[45] Nov. 6, 1973

[54] AMPHOLYTES FOR FOCUSING ELECTROPHORESIS
[75] Inventors: Nikolaus Grubhofer; Peter Pogacar, both of Heidelberg, Germany
[73] Assignee: said Grubhofer by said Pogocar, Heidelberg, Germany
[22] Filed: July 19, 1972
[21] Appl. No.: 273,263

[30] Foreign Application Priority Data
July 28, 1971 Germany.................. P 21 37 617.0

[52] U.S. Cl. ............................ 204/180 R, 204/299
[51] Int. Cl. ............................................. B01k 5/00
[58] Field of Search .................... 204/180 R, 180 D, 204/299

[56] References Cited
UNITED STATES PATENTS
3,240,692   3/1966   Donnelly ......................... 204/180 P
3,355,375   11/1967   Badgley ............................... 204/299
3,485,736   12/1969   Vesterberg ...................... 204/180 R
3,497,438   2/1970   Badgley ........................... 204/180 R Primary Examiner—Howard S. Williams
Assistant Examiner—A. C. Prescott
Attorney—Kurt Kelman et al.

[57] ABSTRACT

Carrier ampholytes suitable for focusing electrophoresis of proteins and like ampholytic compounds of high molecular weight consist of aqueous solutions of aminosulfonates, aminophosphonates, and mixtures of the two with each other and/or with aminocarboxylates. As compared to the known carrier ampholytes based on aminocarboxylates alone, the carrier ampholytes of the invention show more uniform characteristics over a wider range of pH values.

7 Claims, 6 Drawing Figures

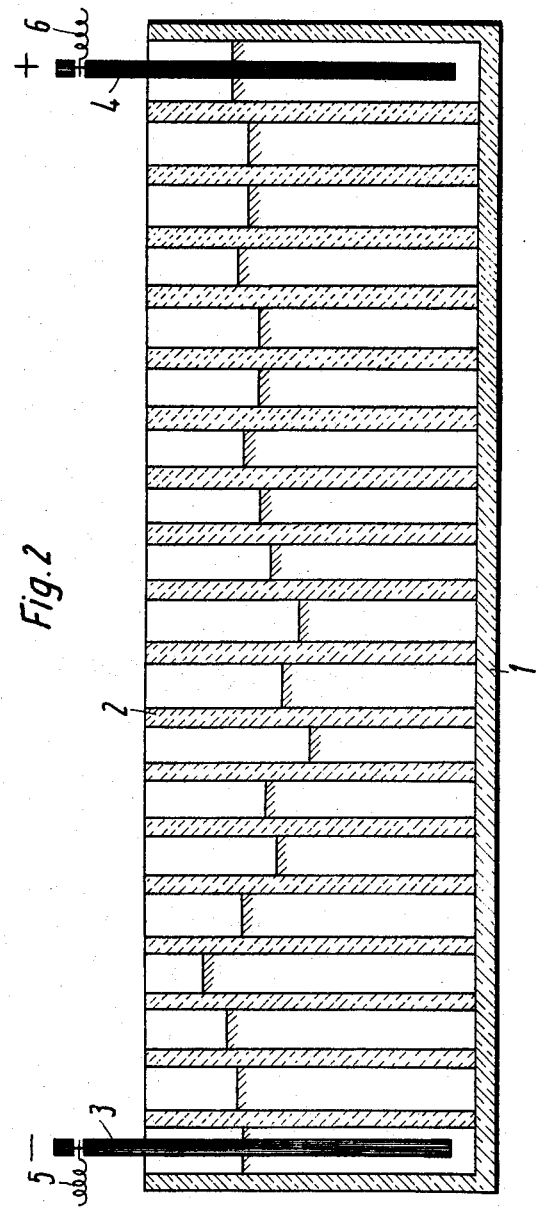

AMPHOLYTES FOR FOCUSING ELECTROPHORESIS

This invention relates to the resolution of complex mixtures by electrophoresis, and particularly to carrier ampholytes for focusing electrophoresis, and to the preparation and use of such ampholytes.

Electrophoresis has been employed for some time for separating the constituent elements of a protein mixture according to their net electric charge. Buffered electrolytes, preferably stabilized by gel formers, were initially employed to cause migration of more positively charged proteins to the cathode, of more negatively charged proteins toward the anode, while proteins whose isoelectric point was equal to the pH of the buffer solution remained stationary. The different rates of migration of the proteins toward the same electrode permitted further separation.

The procedure was made much more effective by H.Svensson (Acta Chem. Scand. 15, 1962; 16, 456–467; Arch. Biochem. Biophys., 132, suppl. 1) who substituted a complex buffer mixture for the single buffer previously employed, the several buffers of the mixture having pK values corresponding to the isoelectric points of the several proteins to be separated. When an electric field is applied to the buffer mixture, the buffers migrate in the electric field, thereby producing a pH gradient in the electrolyte which causes the migration of each buffer to be terminated when it reaches a zone whose pH corresponds to the isoelectric point of the buffer.

The current flowing through the buffer mixture is relatively small, and the individual buffers are concentrated or focused more sharply in corresponding portions of the electrolyte as the electrolysis proceeds. When a protein mixture is introduced into the carrier electrolyte so obtained, the proteins also migrate until they are concentrated or focused in zones of the electrolyte corresponding to their respective isoelectric points. Whereas electrophoresis by the original method had to be interrupted at a critical time after which further processing would cause diffusion of the several protein fractions into each other, the improved method, for the reasons outlined above, causes sharper focusing with extended electrolysis.

The buffers employed by Svensson were naturally occurring amino acids which did not provide a uniform spectrum of pH values and were limited in the overall pH range covered. O. Vesterberg (Acta Chem. Scand. 23, 2653–2666; U.S. Pat. No. 3,485,736) greatly enlarged the scope of Svensson's method by introducing synthetic mixtures of aminocarboxylic acids, particularly those obtained by reacting polyamines, such as pentaethylenehexamine, with acrylic acid. The ampholyte mixtures so obtained are being used successfully, although they do not meet important requirements.

The ideal ampholyte mixture, when placed in an electric field, should show a uniform and steady change in pH over its operative range, and the buffer capacity should be the same in each portion of the field. These requirements are not met by ampholytes of the type disclosed in the afore-mentioned Vesterberg patent as is evident from Table 4 in the patentee's cited own publication (Acta Chem. Scand. 15, 1962), and has been confirmed by others (see, for example, R. Frater, Analyt. Biochemistry 38 [1970] 536–538).

An ampholyte mixture should not form stable complexes with alkaline earth metals and heavy metals. Yet, this is a characteristic property of aminocarboxylic acids, particularly those having a multiplicity of protolytic groups.

For greatest versatility, a carrier ampholyte mixture should be effective not only in the pH range above 5, but also between pH 2 and 3, a range in which the aminocarboxylic acids of the known ampholytic carrier mixture show a significant drop in buffering capacity.

It is the primary object of this invention to improve the isoelectric fractionation of ampholytic polymers by stationary electrolysis by the use of carrier ampholyte mixtures which avoid the shortcomings of the known ampholyte mixtures entirely consisting of polyprotic amino carboxylic acids.

With this object in view and others, as will hereinafter become apparent, the invention, in one of its more specific aspects, resides in an improvement in the isoelectric fractionation and analysis of ampholytes of high molecular weight, particularly proteins and other polymers, by stationary electrolysis in the presence of a carrier ampholyte mixture of at least three polyprotic amino acids with at least four protolytic groups of which at least one is a basic nitrogen atom, the mixture having multiple isoelectric points within a pH spectrum of between 3 and 11 and characterized by the absence of peptide bonds in compounds of the mixture.

Other features, additional objects, and many of the attendant advantages of this invention will readily be appreciated as the same becomes better understood by reference to the following detailed description of preferred embodiments when considered in connection with the appended drawing in which:

FIG. 1 diagrammatically illustrates the relationship between buffer capacity and pH for an ampholyte consisting entirely of aminocarboxylic acids;

FIG. 2 shows a dialysis cell for use in preparing ampholytes of the invention, the view being in sectional elevation;

Figure 4:
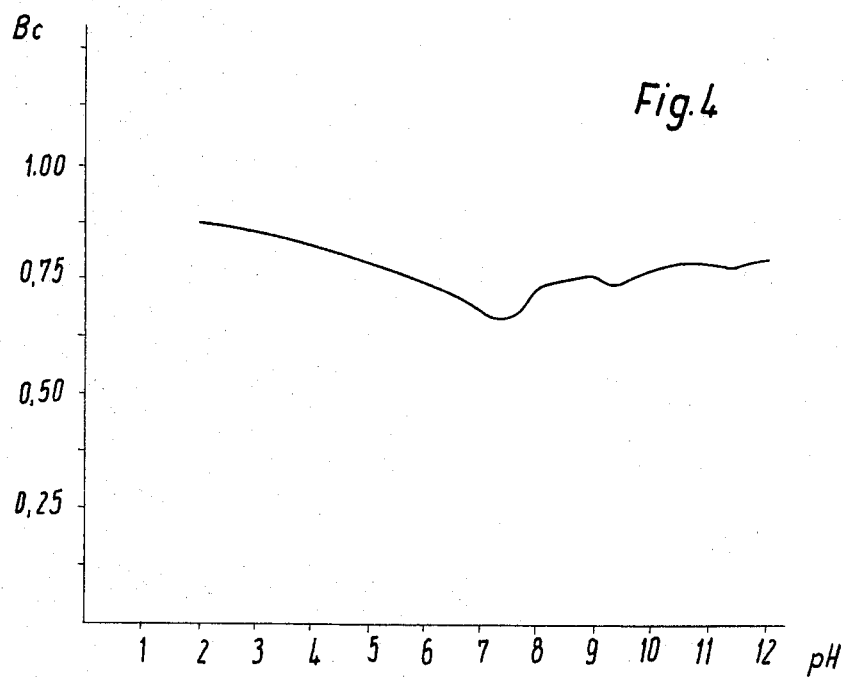
Figure 5:
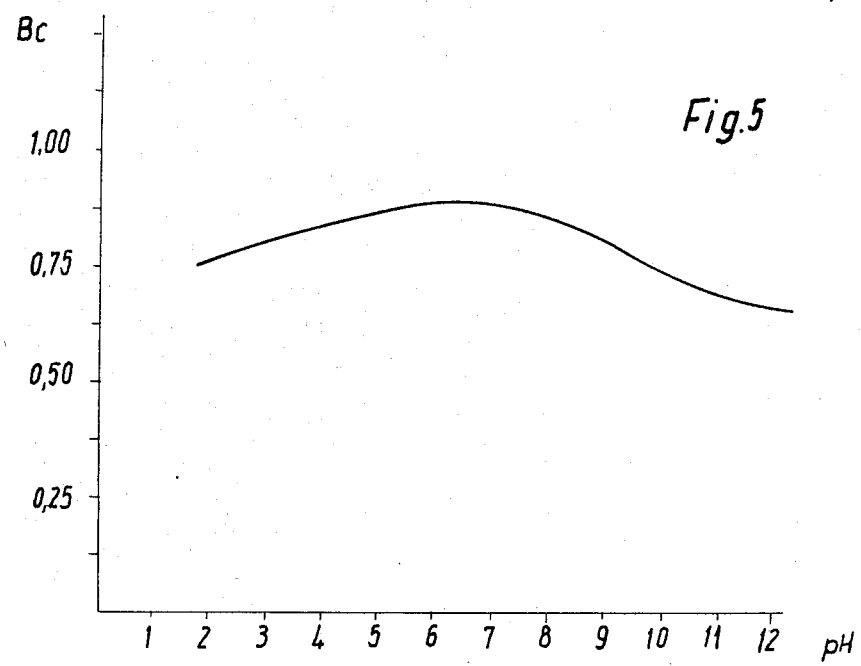
Figure 6:
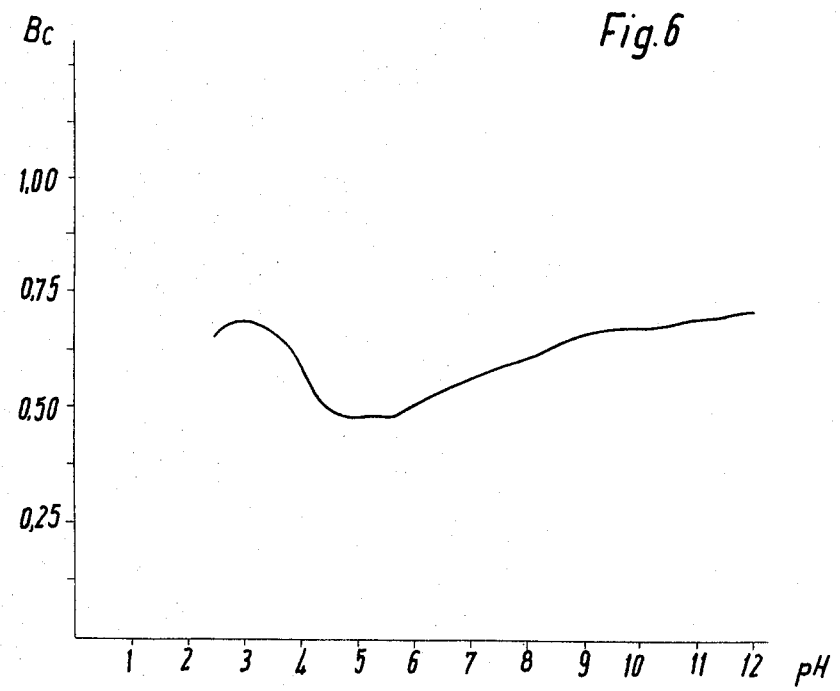

FIG. 4 similarly illustrates buffering capacity as a function of pH for an ampholytic mixture of aminophosphonic acids of the invention;

FIG. 5 diagrammatically illustrates the same characteristics for an ampholyte having both sulfo and phosphono groups; and FIG. 6 similarly shows the relationship between pH and buffering capacity in an ampholyte of the invention having sulfo groups and carboxylic groups.

Figure 1:
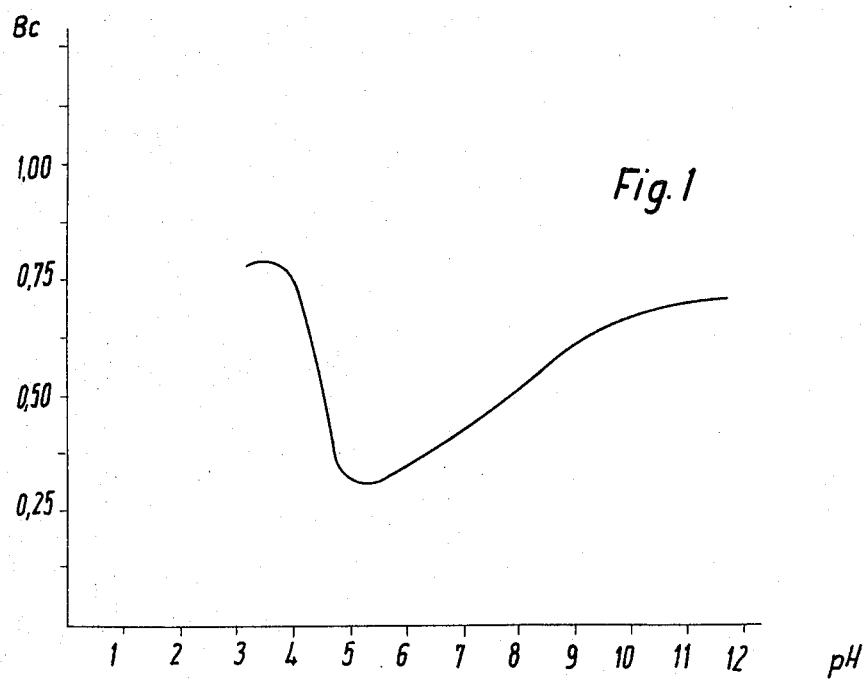

Referring now to the drawing in detail, and initially to FIG. 1, there is shown a diagram of buffering capacity as a function of pH in a synthetic ampholyte mixture of the known aminocarboxylic acid type. The buffering capacity Bc is defined as the amount of acid or alkali in mVal units which causes a change of one pH unit in a milligram mole of ampholyte mixture, the ampholyte molarity being calculated from a nitrogen determination according to Kjeldahl's method.

FIG. 1 clearly shows a gap in buffering capacity between pH 5 and 6 which appears to be an inherent property of ampholyte mixtures consisting of aminocarboxylic acids of any origin (see H. Svensson, Acta Chem. Scand. 16 [1962], 456–466).

Figure 3:
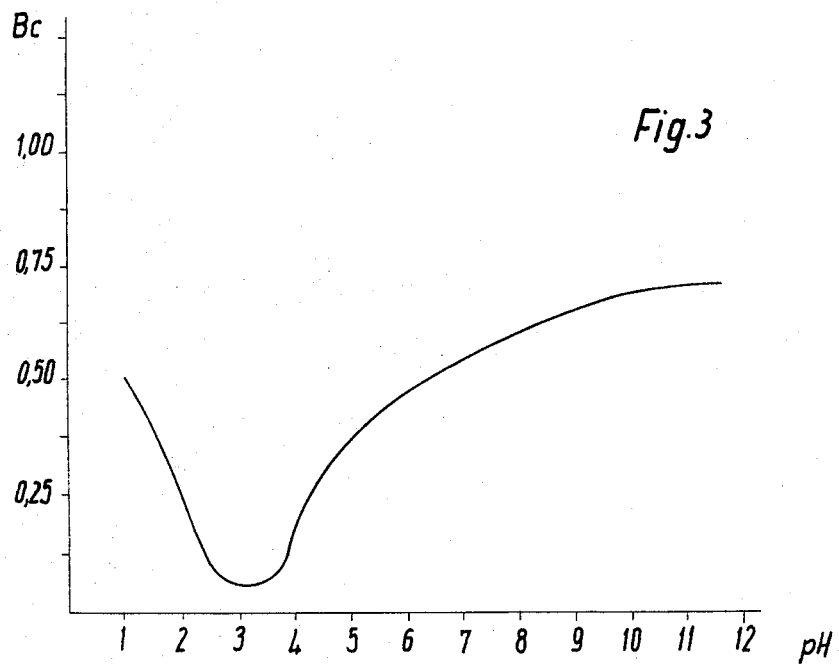
FIG. 3 illustrates the relationship of buffering capacity and pH for an ampholyte mixture of the invention which is of the aminosulfonic acid type in the manner of FIG. 1.

As is evident from the corresponding curves of Bc v. pH in FIG. 3 for ampholyte mixtures of aminosulfonic acids, and in FIG. 4 for ampholyte mixtures of aminophosphonic acids, the ampholyte mixtures of the invention provide adequate buffering capacity which varies with pH in a manner different from the characteristics of the ampholytes of the aminocarboxylic acid type, and thus permit to cover pH ranges in which the ampholytes of the latter type have relative little capacity.

Because the ampholytes of the invention include acids more strongly dissociated than the known aminocarboxylic acids, they provide useful buffering capacity at lower pH values than are available from the known ampholytes.

The aminophosphonic acids, and particularly the amino-sulfonic acids, do not chelate heavy metals as readily as the aminocarboxylic acids, as has been shown by N.E. Good et al (Biochemistry 5 [1966], 467–477).

The aminosulfonic acid mixtures of the invention may be prepared by reacting aliphatic polyamines with propanesultone, the γ-sultone of 3-hydroxy-1-propanesulfonic acid. Equation (I) illustrates one of the reaction patterns in which four moles of propanesultone react with the six nitrogen atoms of pentaethylenehexamine:

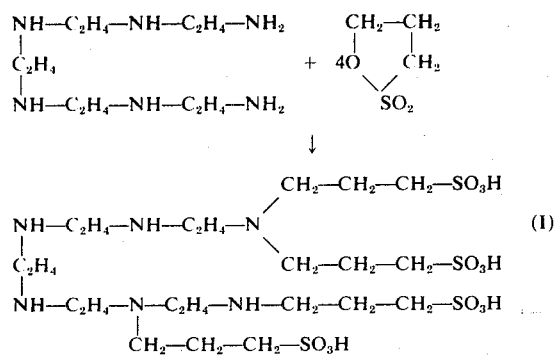

Since it is known that primary amino nitrogen undergoes mono-alkylation and dialkylation in reactions of this type, and that secondary amino nitrogen may also be alkylated, the multiplicity of different aminosulfonic acids available is readily visualized.

Numerous, but certainly more than three polyprotic amino acids are inherently produced, and it is evident from Equation (I) that they have four or more protolytic groups which include a basic nitrogen atom. There are no peptide bonds in the structure shown in Equation (I) nor in its analogs. Other protolytic groups are sulfo groups in the amino acid shown in Equation (I), and an analogous structure will be demonstrated below for the aminophosphonic acids of the invention.

The propylene analogs of pentaethylenehexamine react in the same manner and may replace the latter in the preparation of aminosulfonic acid mixtures, and both lower and higher homologs of pentaethylenehexamine and of the corresponding propyleneamines including polyethyleneamines produce analogous ampholyte mixtures.

It is preferred to employ in the reaction a mixture of 0.5 mole propanesultane per nitrogen atom in the polyamine employed. The reaction is performed in a strongly alkaline, aqueous medium for an adequate completion of the reaction, and barium hydroxide is the preferred alkalinizing agent because it can be removed very conveniently by precipitation of $BaSO_4$. The mixture then consisting essentially of an aqueous solution of the desired aminosulfonic acids is fractionated in the cell illustrated in FIG. 2.

The cell has a container 1 of non-conducting inert material, such as glass, and is subdivided into 19 compartments by 18 parallel diaphragms 2 of porous ceramic material, about 5 mm thick. Electrodes 3, 4 in the first and last compartments are connected to the two poles of a source of direct current, not itself shown, by means of leads 5, 6.

The aminosulfonic acid mixture prepared as described above is distributed over the 19 compartments in such a manner that the liquid levels initially are in a common horizontal plane. As current flows through the compartments, the strongly acid and strongly basic components of the mixture accumulate in the compartments holding the electrodes and partly in the respective, immediately adjacent compartments while the individual buffering ampholytes accumulate in compartments Nos. 3 to 17 according to their isoelectric points.

As the fractionation process approaches its completion, the intensity of the current flowing in the cell drops rapidly, and the liquid levels in the individual compartments vary in a ratio characteristic for the ampholyte mixture. The level differences are produced by equalization of osmotic pressure exerted by the buffers in each compartment.

When a stationary state is reached, the contents of compartments Nos. 1, 2, 18, and 19 are discarded, and the contents of compartments Nos. 3 to 17 are mixed and uniformly distributed in all compartments. Voltage is again applied to the electrodes 3, 4, and the buffers again are accumulated in the several compartments according to their isoelectric points so that a pH and conductivity gradient is established in the cell. The volumes of liquid in each compartment again differ when fractionation is completed.

When equal volumes are withdrawn from the several cells and are mixed, an ampholyte mixture is obtained which has the same molarity and the same buffering capacity over the entire pH range.

Analysis of the ampholyte mixtures is preferably performed in a cell differing in its dimensions only from the cell shown in FIG. 2, and typically having compartments 1 cm wide, 1 cm long, and 20 cm high. It permits ready determination of the molarity of the ampholyte components corresponding to the individual pH values.

A typical ampholyte mixture of the invention, prepared from one mole pentaethylenehexamine and 0.5 mole propanesultone, as described hereinbelow in Example 1, yields the relationship of buffering capacity Bc v. pH shown in FIG. 3 and calculated from the potentiometric titration curve. The mixture of aminosulfonic acids is seen to have adequate buffering capacity in the pH range between 5 and 6 which is not fully covered by aminocarboxylic acids. However, there is a gap in buffering capacity between pH 2 and pH 4. This is not surprising because the sulfonate groups have practically no buffering effect so that the entire available buffering capacity is provided by the amino groups.

The aminophosphonic acids for use in ampholyte mixtures of the invention may be prepared according to the method of U.S. Pat. No. 2,841,611 by reacting a polyamine with chloromethylenephosphonic acid. The reaction between 4 moles chloromethylenephosphonic acid and 1 mole pentaethylenehexamine may proceed, for example, in the manner illustrated by Equation (II):

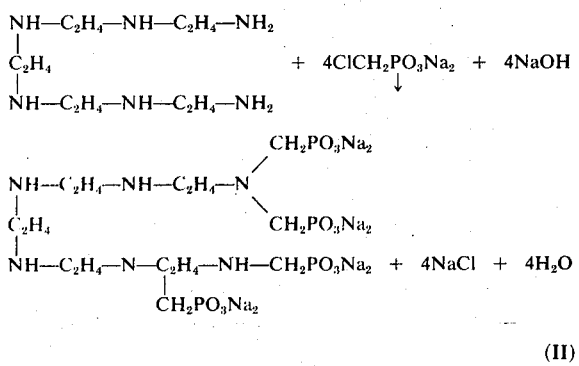

(II)

The necessary alkalinity of the aqueous reaction medium must be provided by means of sodium hydroxide, because barium hydroxide produces precipitates. The sodium ions are removed after completion of the reaction by means of an ion exchange resin of the styrene-divinylbenzene-sulfonic acid type, strongly cross-linked by 20 percent of the divinyl component. Such an ion exchange resin has been found not to adsorb any of the ampholyte.

FIG. 4 shows the characteristic curve of buffering capacity v. pH for an ampholyte of the invention consisting entirely of aminophosphonic acids and prepared from a mixture of 0.5 mole chloromethylenephosphonic acid per nitrogen atom. The good buffering capacity over the entire pH range from 2 to 12 is evident.

It is preferred to employ ampholytes which contain both sulfo and phosphono groups, and the variety of ampholytes in the mixture may further be increased by introducing carboxyl groups.

Ampholytes containing sulfo and phosphono groups may be prepared by reacting a polyamine first with chloromethylenephosphonic acid in a ratio of one nitrogen atom per 1/6 mole chloromethylenephosphonic acid. At this ratio, the alkaline pH of the amine is sufficient to let the reaction proceed to completion. Thereafter, propanesultane may be added to the reaction mixture together with barium hydroxide which does not produce a precipitate at this stage. Combinations of sulfo and carboxyl groups may be provided in a simple manner by reacting the aminosulfonic acid ampholytes with acrylic acid in a known manner.

FIG. 5 and FIG. 6 respectively show the characteristic Bc v. pH curves for such ampholyte mixtures, the curve of FIG. 5 combining features of those of FIGS. 3 and 4, and the curve of FIG. 6 being similarly related to FIGS. 1 and 3.

The ampholytes of the invention which are of the aminosulfonic acid type may also be prepared by reactions between polyamines and bromoethanesulfonic acid or vinylsulfonic acid in a manner evident from Equations (III) and (IV):

$$=NH + Br-C_2H_4-SO_3Na + NaOH$$
$$\rightarrow =N-C_2H_4-SO_3Na + NaBr + H_2O$$

(III)

$$=NH + CH_2=CH-SO_3H \rightarrow =N-CH_2-CH_2-SO_3H$$

(IV)

The variety of the compounds present in the ampholyte mixture, and the spectrum of IP values of buffering compounds may further be enhanced by partially alkylating the amino groups of the polyamine. Tertiary amino groups and quaternary ammonium compounds may thereby be produced. The ammonium groups, of course, cannot react any longer with the acidic alkylating agents such as propanesultane, but residual primary and secondary amino groups may be reacted in the manner described above to produce ampholytes suitable for the purpose of this invention.

As is evident from FIGS. 4 and 5, the two additional types of acidic moieties provided by this invention in ampholyte mixtures and partial alkylation of the amino groups provide a host of novel amphoteric buffers which may be blended or combined to produce a mixture approaching or reaching the goal of absolutely uniform buffering capacity at least over the most important pH range from 3 to 10.

The following Examples further illustrate the invention.

EXAMPLE 1

757.2 g Ba(OH)$_2$.8 H$_2$O was dissolved at 60°C in six liters water in a 10 liter flask equipped with a stirrer, dropping funnel, and cooling jacket, and 556.8 g pentaethylenehexamine was added. Thereafter, a solution of 878.4 g propanesultone (γ-sultone of 3-hydroxy-1-propanesulfonic acid) in 500 ml acetone was added drop by drop to provide 0.5 mole propanesultone for each nitrogen atom in the polyamine. Four hours later, 2.4 liters 2N sulfuric acid were added to precipitate the barium from the reaction mixture, the barium sulfate was removed by centrifuging and washed, and the combined washings and supernatant, which were free from barium and had a pH of 4 to 5, were diluted with water to 15 liters.

The chambers of the electrolytic cell shown in FIG. 2 were charged each with 100 ml of the diluted liquid, and a potential of 100 to 150 volts was applied to the electrodes in the first and last chambers for 48 hours so as to maintain a current not exceeding 60 milliampere. The fractions were individually withdrawn from the 19 cells, and equal volumes of electrolyte from cells Nos. 3 to 17 were combined to produce an ampholyte having characteristics not significantly different from those represented by FIG. 3.

EXAMPLE 2

A mixture of 560 g pentaethylenehexamine, 500 ml 50 percent sodium hydroxide solution, and 3 liters water was combined with a solution of 1,300 g disodium chloromethylenephosphonate in three liters water. The reaction mixture was refluxed for fifteen hours, cooled, and filtered, and the filtrate was diluted with water to 30 liters and percolated over a column of 30 cm diameter containing 40 liters Zeo-KARB SRC-21, a carbonaceous zeolite in the H form. The liquid discharged from the column was almost colorless, and was evaporated to about 15 liters. The concentrate was fractionated by electrolysis, as described in Example 1, and the combined equal volumes of fractions three to 17 formed an ampholyte whose characteristics were as shown in FIG. 4.

EXAMPLE 3

A mixture of 560 g pentaethylenehexamine, 300 g chloromethylenephosphonic acid, and three liters water having a pH of 10 was refluxed for 15 hours. Thereafter three liters of an aqueous solution of 750 g $Ba(OH)_2 \cdot 8H_2O$ was added, and the temperature was set at 60°C. At that temperature, 600 g propanesultone in 400 ml acetone were added dropwise. After four hours, the barium was precipitated with approximately 2.4 liters 2 m sulfuric acid, and the precipitate was removed by centrifugation. The combined supernatant and washings were evaporated to approximately one half the original volume, and the solution so obtained was fractionated in the apparatus of FIG. 2. The combined equal volumes of fractions three to 17 provided an ampholyte combining characteristic features of the products of Examples 1 and 2, as is evident from FIG. 5.

EXAMPLE 4

Three liters of a 20 percent solution of an ampholyte prepared as described in Example 1 were heated to 50C, and 400 ml of an aqueous, 50 percent solution (by weight) of acrylic acid was gradually added over a period of one hour. The solution so obtained was kept at 50°C for 15 hours. When cooled to ambient temperature, and without any further processing, it showed the characteristics of an ampholyte illustrated in FIG. 6.

EXAMPLE 5

A solution of 230 g (one mole) pentaethylenehexamine in two liters methanol was mixed with 250 g (2 mole) dimethyl sulfate, and the mixture was refluxed for four hours. The resulting product was diluted with five liters water, and the diluted solution was evaporated to one half of its original volume. The concentrate was passed over a column containing five liter of the strongly basic ion exchange resins DOWEX 1×8 for removal of the methyl hydrogen sulfate. The purified liquid was then further processed by electrolysis as described in Example 1, and yielded an ampholyte similar in its characteristics to that of Example 1.

EXAMPLE 6

2.32 g (0.01 Mole) pentaethylenehexamine was dissolved in 15 ml water and mixed sequentially with a solution of 3 g $Ba(OH)_2 \cdot 8H_2O$ in 15 ml water and 6 g barium bromoethanesulfonate. The mixture was refluxed for four hours, and the barium present was precipitated thereafter by means of sulfuric acid, an excess of the acid being avoided carefully. The liquid separated from the barium sulfate was further processed by electrolysis as described in Example 1 to yield an ampholyte closely similar to that described in that Example.

EXAMPLE 7

2.32 g Pentaethylenehexamine dissolved in 30 ml water was mixed with 3.25 sodium vinyl sulfonate, and the mixture was refluxed for five hours. The solution so obtained was diluted to 100 ml and passed over a column of 100 ml Zeo-KARB SRC-21 in the hydrogen form to remove the sodium ions. The liquid discharged from the column was evaporated to 20 ml, fractionated in apparatus differing in dimensions only from that shown in FIG. 2, and further processed to form an ampholyte as described in Example 1.

What is claimed is:

1. In a method for isoelectric fractionation and analysis of high molecular ampholytes by stationary electrolysis, said electrolysis being performed in the presence of a carrier ampholyte mixture of at least three polyprotic amino acids with at least four protolytic groups of which at least one is a basic nitrogen atom, said mixture having multiple isoelectric points within a pH spectrum of between 3 and 11 and characterized by the absence of peptide bonds in compounds of said mixture, the improvement which comprises at least one other of said protolytic groups being a sulfo group or a phosphono group.

2. In a method as set forth in claim 1, said at least one other group being a sulfo group.

3. In a method as set forth in claim 1, said at least one other group being a phosphono group.

4. In a method as set forth in claim 1, at least one of said other protolytic groups being a sulfo group, and yet another one of said protolytic groups being a phosphone group.

5. In a method as set forth in claim 1, a further one of said other protolytic groups being a carboxyl group.

6. In a method as set forth in claim 1, at least one of said polyprotic amino acids including a quaternary ammonium group.

7. In a method as set forth in claim 1, said mixture having multiple isoelectric points within a pH range of between 2 and 11 and substantially uniform buffering capacity over said range.

* * * * *